(12) United States Patent
Shapiro et al.

(10) Patent No.: US 10,638,743 B1
(45) Date of Patent: May 5, 2020

(54) BATTERY POWERED DEVICE FOR DISPENSING A VOLATILE SUBSTANCE

(71) Applicant: Thermacell Repellents, Inc., Bedford, MA (US)

(72) Inventors: Stephen J. Shapiro, Arlington, MA (US); Wender Wang, Bedford, MA (US)

(73) Assignee: Thermacell Repellents, Inc., Bedford, MA (US)

( * ) Notice: Subject to any disclaimer, the term of this patent is extended or adjusted under 35 U.S.C. 154(b) by 609 days.

(21) Appl. No.: 15/147,509

(22) Filed: May 5, 2016

Related U.S. Application Data

(60) Provisional application No. 62/157,319, filed on May 5, 2015, provisional application No. 62/157,807, filed on May 6, 2015.

(51) Int. Cl.
*A01M 29/14* (2011.01)
*A01M 1/20* (2006.01)
*H01M 2/10* (2006.01)
*H01M 10/48* (2006.01)
*A01M 3/00* (2006.01)

(52) U.S. Cl.
CPC .......... *A01M 1/2061* (2013.01); *A01M 3/007* (2013.01); *H01M 2/1022* (2013.01); *H01M 10/48* (2013.01); *H01M 2220/30* (2013.01)

(58) Field of Classification Search
CPC ........ A01M 1/00; A01M 1/02; A01M 1/2061; A01M 1/2077
USPC ................ 219/220, 518, 441, 528; 392/392; 422/123, 125, 126, 305, 306
See application file for complete search history.

(56) References Cited

U.S. PATENT DOCUMENTS

| | | | | | |
|---|---|---|---|---|---|
| 2,931,880 | A | * | 4/1960 | Yaffe | F24H 1/00 392/390 |
| 4,391,781 | A | * | 7/1983 | van Lit | A61L 9/03 219/243 |
| 4,731,522 | A | * | 3/1988 | Manchester | A01M 1/2077 219/433 |
| 4,758,708 | A | * | 7/1988 | Manchester | A01M 1/2077 219/432 |
| 4,777,345 | A | * | 10/1988 | Manchester | A01M 1/2077 219/517 |
| 4,780,286 | A | * | 10/1988 | Parent | A01M 1/2077 219/433 |
| 4,905,129 | A | * | 2/1990 | Sharrah | F21L 15/06 200/60 |
| 5,168,654 | A | * | 12/1992 | Chien | A01M 1/2083 239/136 |
| 5,700,430 | A | * | 12/1997 | Bonnema | A01M 1/2088 126/401 |
| 5,922,231 | A | * | 7/1999 | Karst | H05B 3/14 219/504 |

(Continued)

FOREIGN PATENT DOCUMENTS

EP        0886458 A2 * 12/1998 ............. H05B 3/141

*Primary Examiner* — Jimmy Chou
(74) *Attorney, Agent, or Firm* — Levisohn Berger LLP

(57) ABSTRACT

A battery powered insect repellent device capable of the battery being separated from the volatile dispenser element and further including wireless communication facilities between a smartphone and the repellent device enabling electronic monitoring of the status of the various elements in the device as well as displaying the same to the user.

15 Claims, 7 Drawing Sheets

(56) References Cited

U.S. PATENT DOCUMENTS

| | | | | |
|---|---|---|---|---|
| 5,928,605 A * | 7/1999 | Bonnema | A01M 1/2088 | 126/401 |
| 6,374,045 B2 * | 4/2002 | Basaganas Millan | A01M 1/2077 | 392/391 |
| 6,503,459 B1 * | 1/2003 | Leonard | A01M 1/2088 | 422/120 |
| 7,002,114 B2 * | 2/2006 | He | A61L 9/03 | 219/482 |
| 7,167,641 B2 * | 1/2007 | Tam | A01M 1/2072 | 392/392 |
| 7,196,293 B2 * | 3/2007 | Britto | H01R 13/7038 | 219/387 |
| 7,835,132 B2 * | 11/2010 | Mesika | H05C 1/00 | 361/223 |
| 7,928,828 B2 * | 4/2011 | Kahr | H01C 7/02 | 338/22 R |
| 8,125,344 B2 * | 2/2012 | Hendren | G06F 1/1616 | 340/636.1 |
| 8,296,993 B2 * | 10/2012 | Modlin | A01M 29/12 | 239/102.2 |
| 8,369,694 B2 * | 2/2013 | Pitz | A61L 9/03 | 219/201 |
| 8,533,511 B2 * | 9/2013 | Ma | G06F 1/1684 | 713/300 |
| 10,271,538 B2 * | 4/2019 | Shapiro | A01M 29/14 | |
| 2005/0011882 A1 * | 1/2005 | Kim | H05B 1/0277 | 219/528 |
| 2005/0184059 A1 * | 8/2005 | Clothier | H05B 6/62 | 219/618 |
| 2006/0039685 A1 * | 2/2006 | Berrido | A61L 9/02 | 392/392 |
| 2006/0237439 A1 * | 10/2006 | Norwood | A01M 1/2077 | 219/506 |
| 2007/0181054 A1 * | 8/2007 | Adair | A01M 1/2077 | 116/207 |
| 2009/0196585 A1 * | 8/2009 | Pohl | A01M 1/2077 | 392/392 |
| 2009/0294553 A1 * | 12/2009 | Wang | A01M 29/12 | 239/135 |
| 2010/0012643 A1 * | 1/2010 | Li | A47J 39/02 | 219/387 |
| 2011/0057051 A1 * | 3/2011 | Wang | A01M 1/2088 | 239/34 |
| 2011/0184502 A1 * | 7/2011 | Bruder | A61F 7/007 | 607/114 |
| 2011/0192830 A1 * | 8/2011 | Wilson | F24C 7/10 | 219/386 |
| 2012/0153040 A1 * | 6/2012 | Miguens | A61L 9/037 | 239/44 |
| 2013/0344449 A1 * | 12/2013 | Masterson | F23D 3/08 | 431/333 |
| 2014/0268882 A1 * | 9/2014 | Hoang | F21S 8/035 | 362/642 |
| 2015/0181859 A1 * | 7/2015 | Shapiro | A01M 29/12 | 239/135 |
| 2018/0167764 A1 * | 6/2018 | Wu | A01M 23/00 | |

* cited by examiner

BATTERY POWERED DEVICE FOR DISPENSING A VOLATILE SUBSTANCE

RELATED APPLICATIONS

This application is based on the priority of provisional patent applications Ser. No. 62/157,319, filed May 5, 2015 and Ser. No. 62/157,807, filed May 6, 2015, the contents of which are incorporated herein.

FIELD OF THE INVENTION

The present invention relates generally to portable dispensing devices, more specifically to a battery-powered device for dispensing a volatilizable substance.

BACKGROUND OF THE INVENTION

Many people utilize portable devices to heat volatile substances such as mosquito repellents as part of camping gear or for various outdoor activities where there exists a threat of mosquitoes. Such volatile substances most commonly are either insect control active ingredients or air treatment materials, such as air fresheners. The mosquito repellent systems are manifold, and for camping or special uses, it is desirous that the mosquito repellent system be portable and easy to operate.

An example of a prior art mosquito repellent system is that of U.S. Pat. No. 5,928,605, assigned to the instant assignee. In that device, a butane cartridge supplies fuel to uniformly heat a thermally conductive plate upon which a mat containing volatile insect repellent is positioned. When the plate is sufficiently heated, the insect repellent is volatilized and thereby dispensed. The evaporation of the insecticide and its dispersion causes mosquitoes to be repelled for a reasonable space around the portable mosquito repellent device.

However, there is a need in the art for a dispensing device that is battery operated—thereby avoiding the need for hydrocarbon combustion.

SUMMARY OF THE INVENTION

The present invention addresses these limitations by providing a device to dispense a volatile substance, which is powered by batteries.

DETAILED DESCRIPTION OF THE INVENTION

Embodiments of the present invention will now be described with reference to the above-identified Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein, all without departing from the spirit of the invention.

The inventive dispenser has a heating plate, a heating chamber or such similar heat box for heating a mat that is impregnated with insect repellent or other volatilizable substance. When sufficient heat is transferred to the mat, the impregnated substance is volatilized and dispensed.

Figure 1:
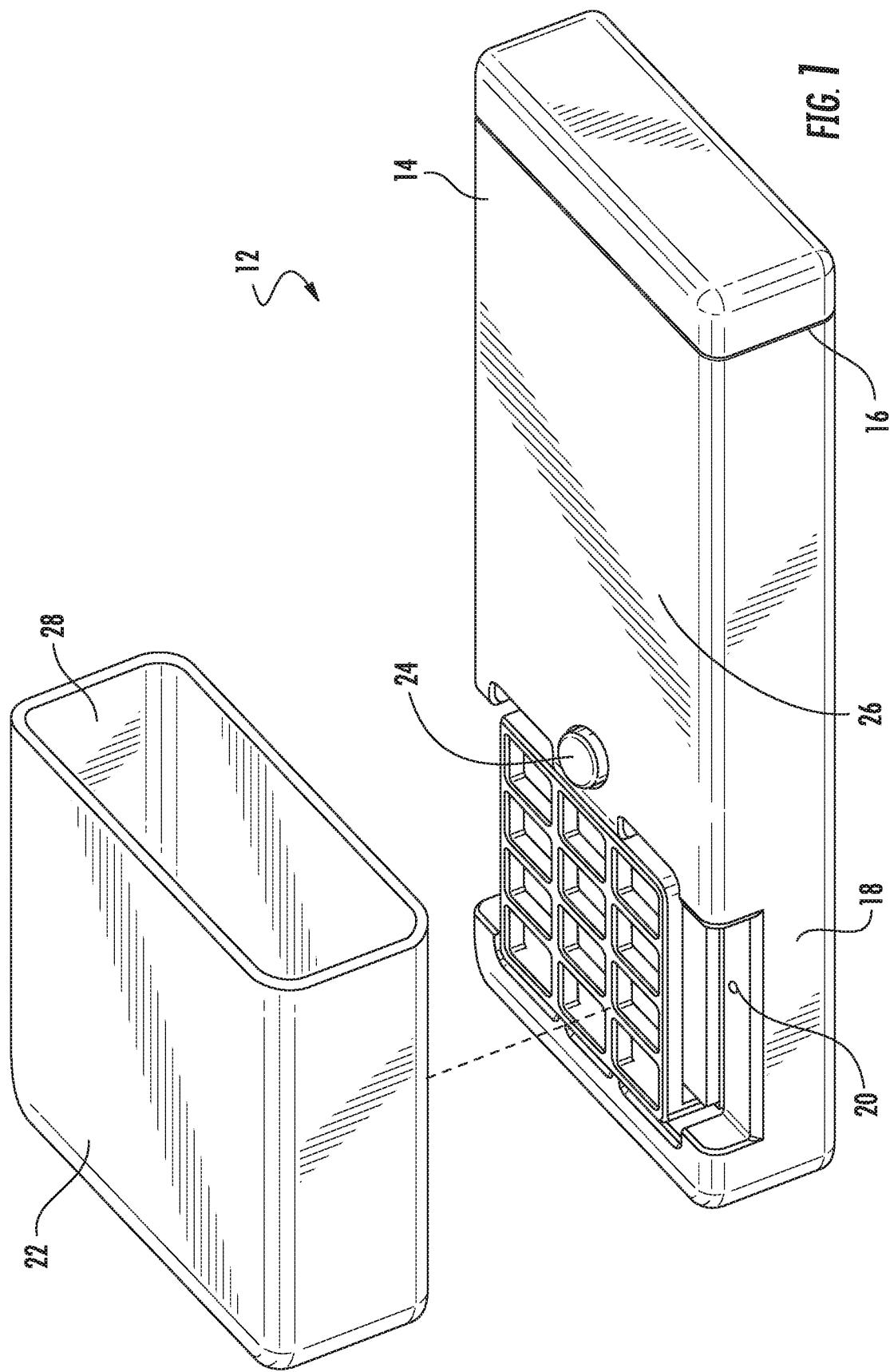
FIG. 1 is a perspective exploded view of the housing of this invention with a portable cover shown removed.

FIG. 1 shows a battery-powered unit 12 according to one embodiment of the invention. As shown, housing 14 of unit 12 has a first end 16 and a second end 18. First end 16 houses one or more batteries and electrical circuitry for delivering electric current to a heating element. Second end 18 is a dispensing end. Dispensing end 18 houses a heating plate 20 comprising a thermally conductive material—such as aluminum, copper or the like—for receiving a mat impregnated with a volatilizable substance. The heating plate 20 is secured atop of the heat source and is in thermal communication therewith. When the heat source is activated, heat is transferred to the conductive plate. The conductive plate 20 reaches a sufficient temperature so as to dispense a volatilizable substance in thermal communication therewith.

In an embodiment of the invention, a ceramic material is used as a heating plate 20. The ceramic material itself may be conductive, it may be coated with conductive material, or a combination of both is possible. For example, molybdenum disilicide (MoSi2) may be used. Molybdenum disilicide is an intermetallic compound, a silicide of molybdenum, and is a refractory ceramic primarily used in heating elements.

In the embodiments where ceramic material is used—the ceramic material may be utilized as both a heating element and as a heating plate. That is, because the ceramic material is conductive, a ceramic plate may be used to both generate heat and receive a mat impregnated with a volatilizable substance—dispensing with the need for a separate heating element and a separate heating plate.

In another embodiment of the invention, heaters with PTC Ceramic elements may be utilized. PTC ceramic material is named for its positive thermal coefficient of resistance (i.e., resistance increases upon heating). This class of ceramics (often barium titanate and lead titanate composites) has a highly nonlinear thermal response, so that it becomes extremely resistive above a composition-dependent threshold temperature. This behavior causes the material to act as its own thermostat. PTC heaters draw very high current briefly when they are cold (room temperature) so special control circuitry, generally available, is required to use them with lithium polymer batteries.

One or more batteries are held within first end 16 of housing 12. Batteries may be removable or they may be rechargeable and permanently affixed therein. In the embodiment where rechargeable batteries are affixed to the inner housing, contacts on an outer surface thereof in the conventional manner are accessible to charging the batteries.

Removable batteries may be rechargeable either in place within the unit, or outside of the unit with an accessory charger.

FIG. 1 shows a cover 22 that is a pocket or similar casing having a shape similar to unit 12 that fits over dispensing end 18 of unit 12. Cover 22 protects the heating plate and any exposed mechanical and/or electrical elements disposed therebelow. In a preferred embodiment of the invention, an on/off button 24 is positioned within the reach of an inner wall of cover 22, when cover 22 is inserted over dispensing end 18.

In the embodiment shown in FIG. 1, an on/off switch comprising a button 24 extending upwardly from a top surface 26 of housing 12 is positioned to be contacted by top inner wall 28 of cover 22. As such, if a user attempts to place cover 22 on unit 12 while the unit is still on—once the user fully slides the cover over the unit, the inside wall 28 of cover 22 will bear against the "off" button and interrupt electric current from flowing to the heating element.

It will be understood by those of ordinary skill in the art that cover may communicate with "off" switch in any of various configurations—so long as cover 22 physically contacts a button, lever, or switch or is brought into proximity with a sensor to have sufficient force to push the button 24 and thereby terminate flow of electric current.

Figure 2:
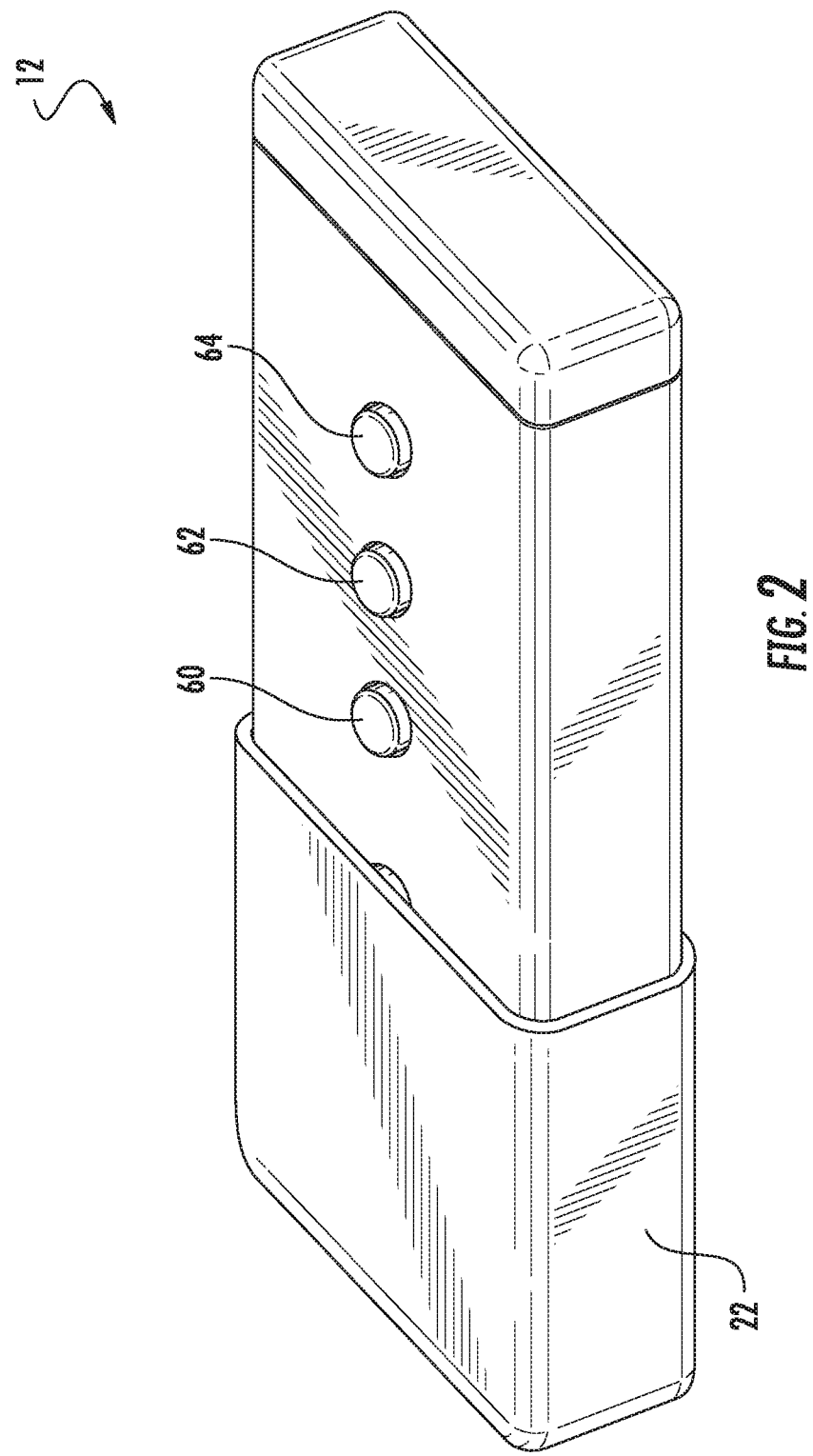
FIG. 2 is a perspective view of the portable heating device with the cover attached thereto.

FIG. 2 shows cover 22 inserted on unit 12. As shown, dispensing end 18 and "on/off" button 24 are obscured by cover 22.

Figure 3:
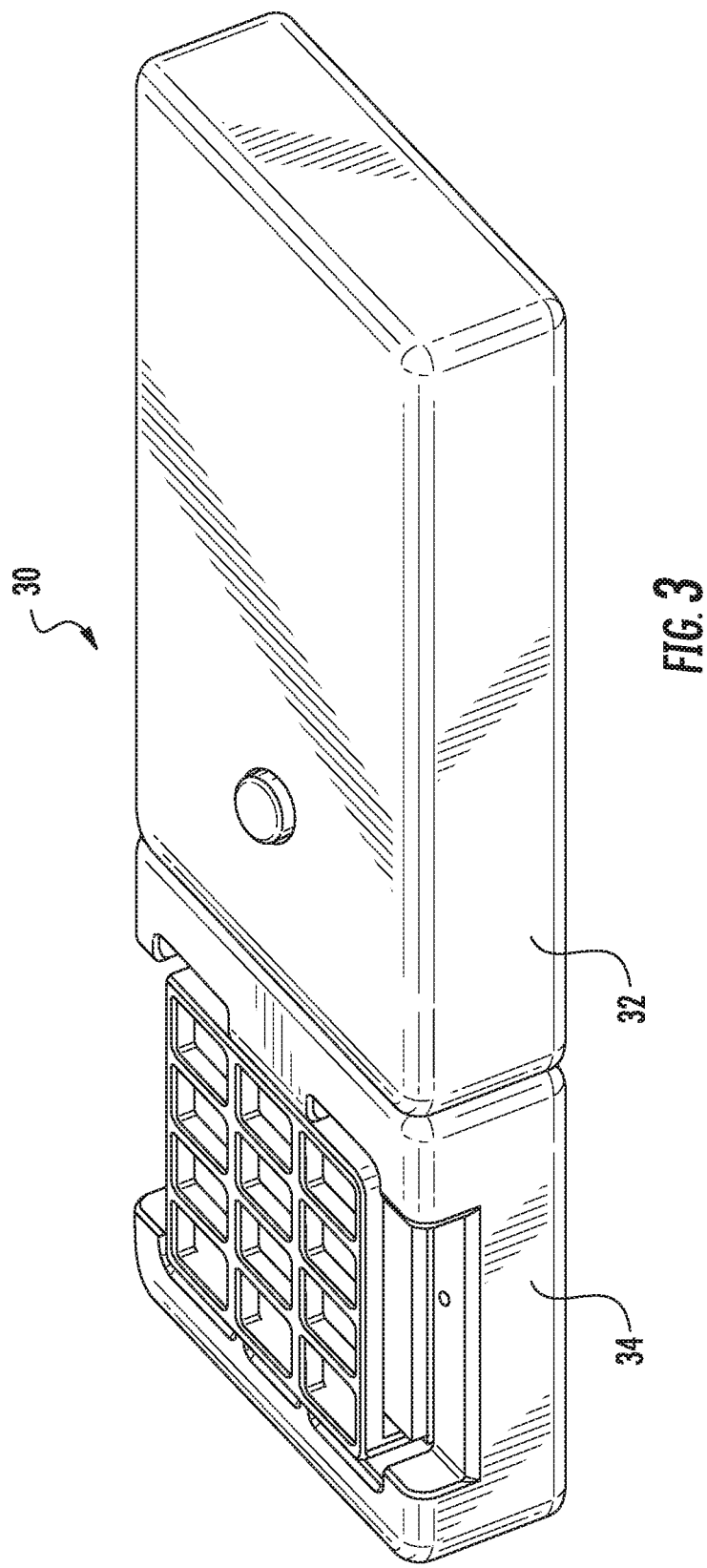
FIG. 3 is a perspective view of the rechargeable battery section connected to the insect repellent active ingredient dispersion section.

FIG. 3 shows another embodiment of this invention, where rather than a single housing for holding batteries and dispensing elements—the unit is divided into two separate detachable parts. As shown, unit 30 has a first battery housing 32 having an empty space to hold batteries in a cavity thereof and a separable second dispenser housing 34 for holding a heating element, heating plate and other dispenser elements.

Figure 4:
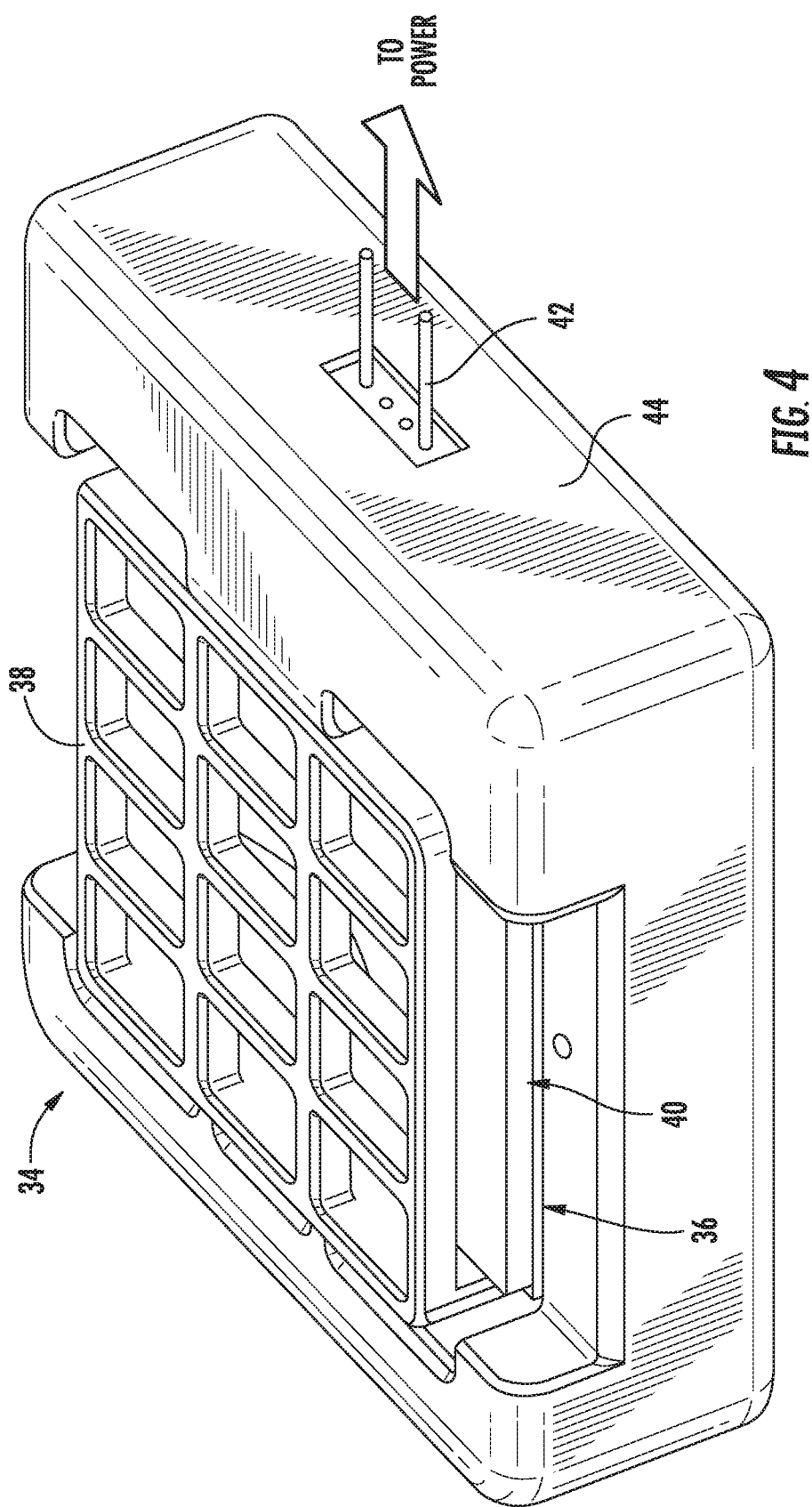
FIG. 4 is a perspective view of the insect repellent active ingredient dispersion section showing power connections emanating therefrom.

FIG. 4 shows dispenser housing 34 of FIG. 3 separated from battery housing 32 according to an embodiment of the invention. As shown, a heating plate 36 (or heat exchanger) is disposed below a grill 38. A mat 40 may be placed atop heat exchanger 36 and below grill 38. The heating elements and/or conductive plates described with respect to FIGS. 1 and 2 may be used in the embodiment shown in FIGS. 3-7 and the specifics are not repeated here.

As shown in FIG. 4, one or more electrical contacts 42, leads or similar conductive elements extend from dispenser housing 34 and are insertable into a cooperating slot or receptacle in battery housing 32. Contacts 42 contact the electrical circuitry disposed in battery housing 32 and they deliver current to power a heating element disposed in dispenser housing 34. It should be noted that in one embodiment of the invention, contact may emanate from battery housing 32 and insert into dispenser housing 34. Alternatively, contacts may be a flat contact surface positioned on side surface 44 of dispenser housing 32, which aligns with a similar contact surface positioned on a side surface 46 of battery housing 32 (side surface 32, shown in FIG. 5). The respective contact surfaces contact one another when dispenser housing 34 is connected to battery housing 32.

Figure 5:
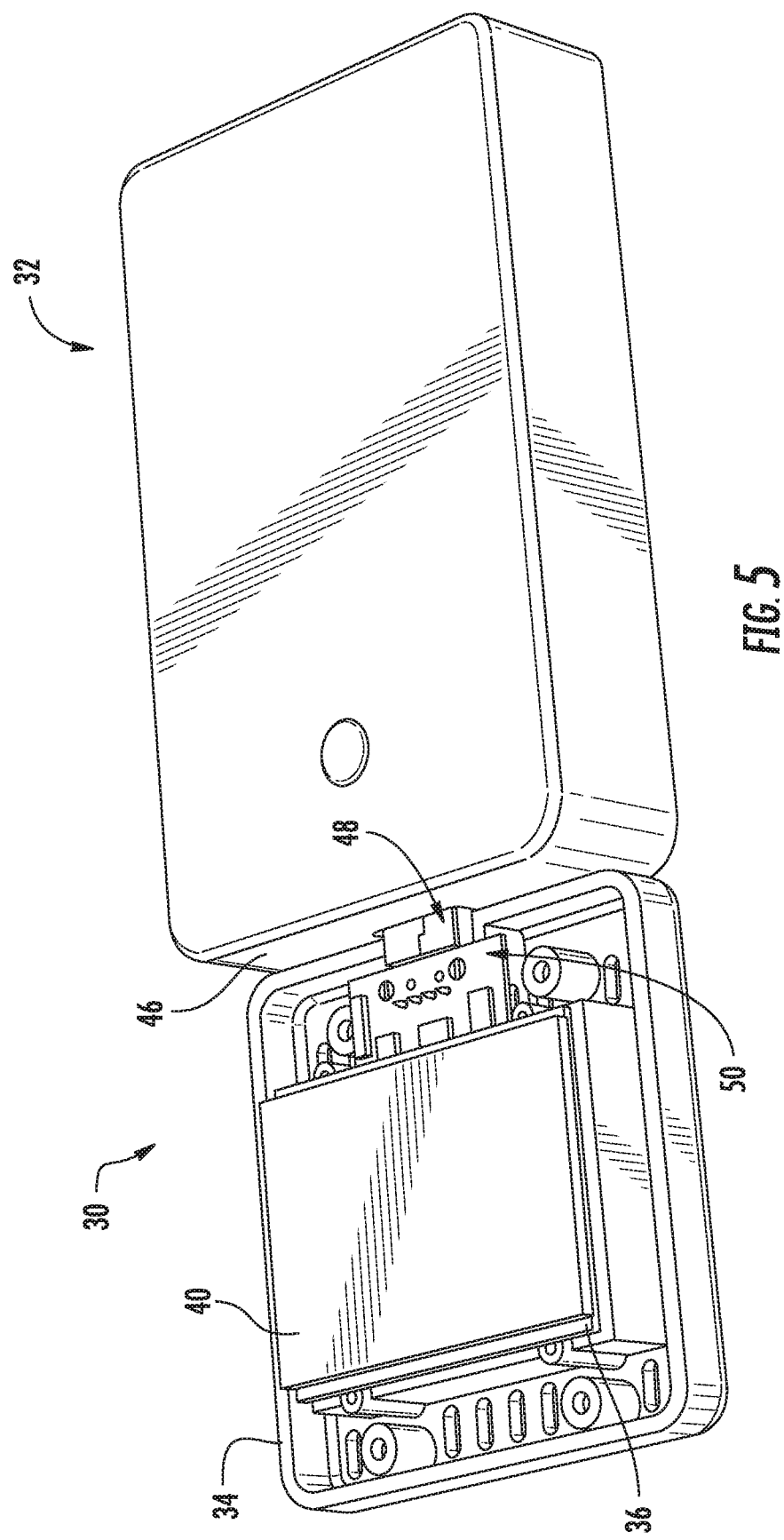
FIG. 5 is a top perspective view of this invention with the cover off.

FIG. 5 shows housing 32 connected to dispenser housing 34 in one embodiment of the invention. The top cover of dispenser housing 32 is removed for visual clarity. An electrical connector 48 is shown electrically coupling battery housing 32 to dispenser housing 34. A printed circuit board 50 with a temperature controller also is shown for controlling the temperature of the heating element.

Figure 6:
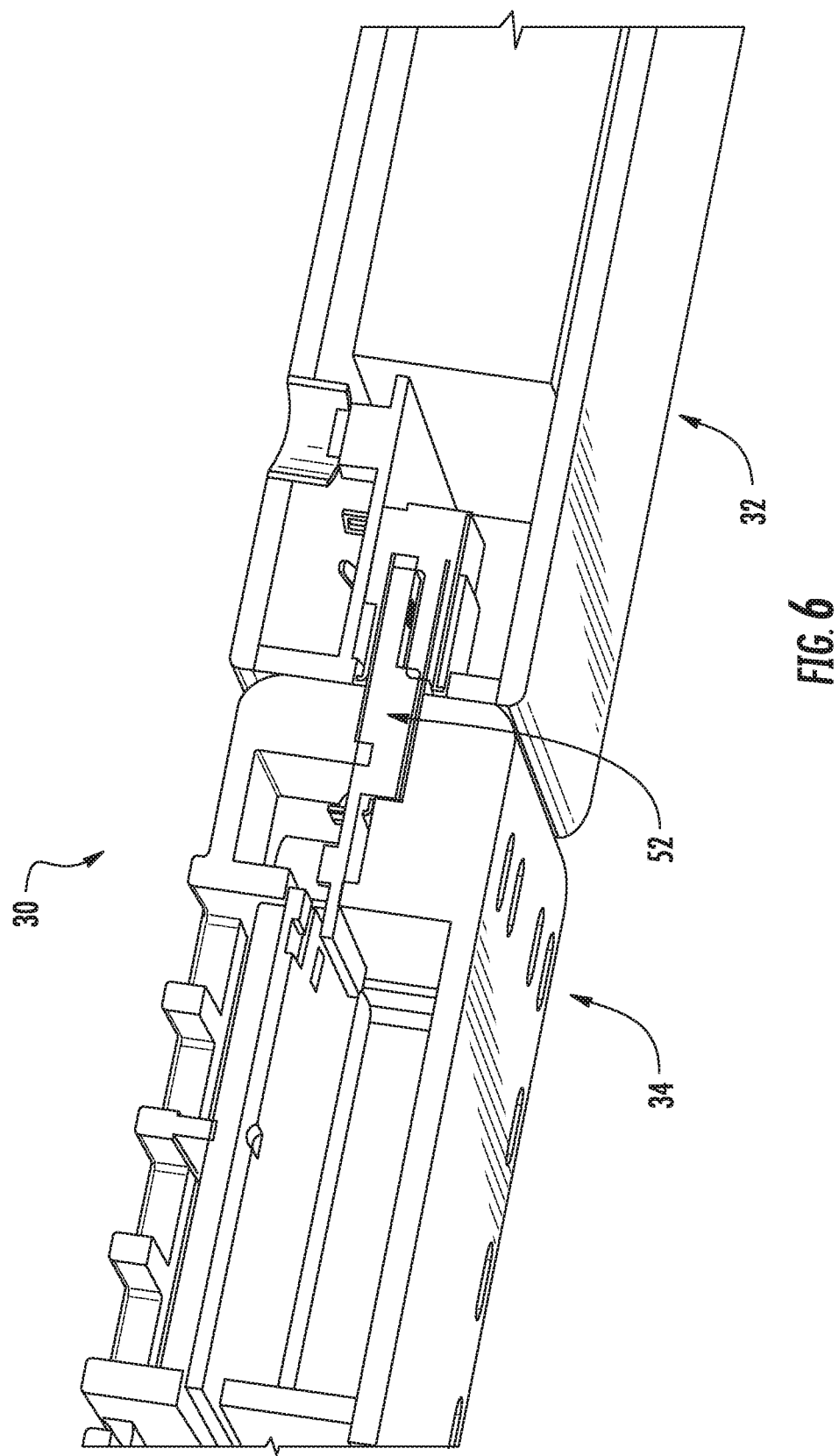
FIG. 6 is a sectional perspective view showing the battery section and the insect repellent active ingredient dispersion section connected together.

FIG. 6 shows a partial cross-sectional view through the length of a unit 30. As shown, a connector assembly 52 couples dispenser housing 34 to battery housing 32. It will be understood, that in addition to an electrical connection between dispenser housing 34 and battery housing 32, the unit may also have a mechanical coupling mechanism for securing the two housing parts together. Connection assembly could be any of various male/female connections, snaps, detents or similar temporary securement devices. In addition, in a preferred embodiment of the invention, the coupling mechanism ensures that any electrical contact between dispenser housing 34 and battery housing 32 is covered and insulated.

Figure 7:
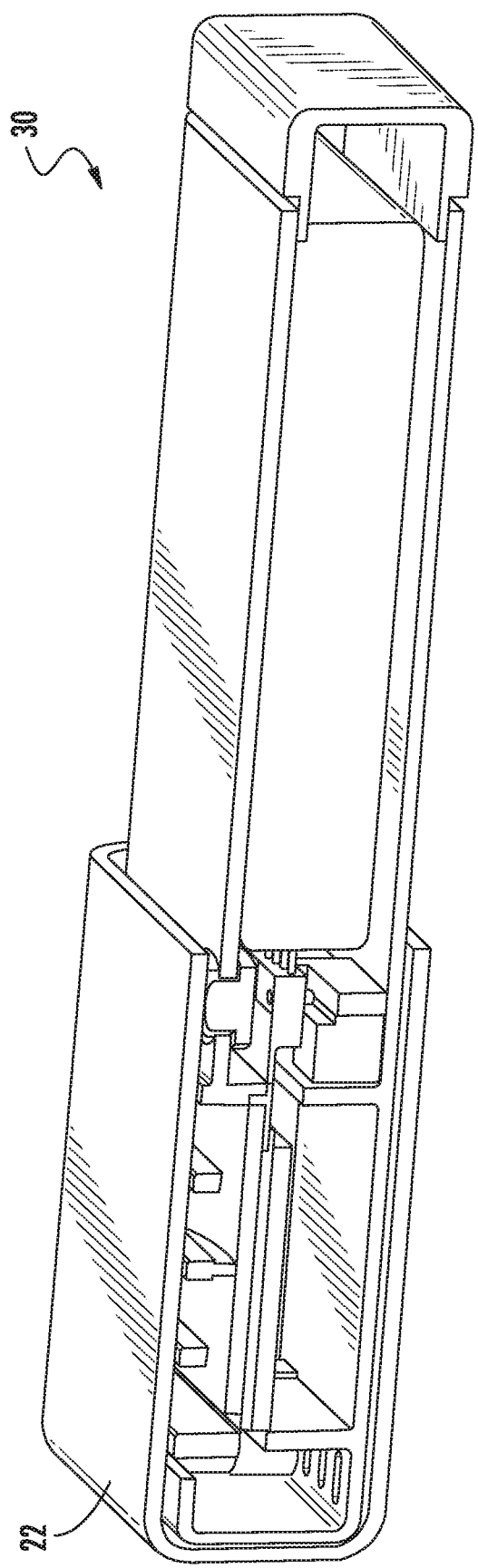
FIG. 7 is a front perspective sectional view showing the battery section and the insect repellent active ingredient dispersion section connected together.

FIG. 7 shows unit 30 having a cover similar to that described with reference to FIGS. 1 and 2 in which the cover ensures that when placed over the unit the on/off switch is moved to the off position to turn off the device.

It should be noted that although separable unit 30 was described with respect to a battery housing 32 and dispenser housing 34, it will be understood by those of ordinary skill in the art that any of various attachments to battery housing 32 are possible according to different embodiments of the invention. For example, a flashlight, a fan, a radio or any such similar electronic device may be provided with one or more electrical contacts, leads or similar conductive elements extending therefrom are insertable into a cooperating slot or receptacle in battery housing 32. In addition, the dispensing housing 34 may be attachable to other power sources in addition to the batter housing 32. That is, electrical contacts, leads or similar conductive elements on dispensing housing 34 may align with and or contact cooperating contacts or a respectable on an automobile or a boat. For example, a boat may be provided with a receptacle that derives electricity from the boat engine and which is adapted to receive a dispensing housing 32.

In one embodiment of the invention, the inventive battery-powered devices described herein may be remotely controlled via a remote control device, computer, smart phone or similar devices. As described, units 12, 30 generate heat by an electric heat source powered by batteries, and there are unique advantages due to the differences in using a battery-powered, electric heat source rather than butane-powered combustion. With electric power, no valves, seals, or lighted candles need to be manipulated in order to turn the device on or off. Various functions of the unit may, thus, be controlled via wireless systems such as Bluetooth or by remote control transmitters/receivers known in the art. Commands such on/off and temperature control may be wirelessly transmitted to the unit. Furthermore, in one embodiment, the units are capable of two-way communication, whereby, in addition to wirelessly receiving commands—the unit sends information relating to operating conditions to a user's remote handheld device, computer or smartphone for monitoring purposes. For example, the unit may send information battery charge level and operating temperature, which information is displayed on a user's smartphone or computer.

Moreover, with prior combustion-based dispensing device, a user usually peers into the repellent vaporizer to observe the fuel level remaining in the butane cartridge. In an embodiment of the invention, however, units 12, 30 are provided with a visible display indicating battery status, status of the unit (on/off), progress of battery charge and similar operational conditions such as temperature of the heating plate, on/off conditions, etc. In an embodiment of the invention the visible display is one or more lights or LEDs. For example, a series of LEDs 60, 62 and 64 may be provided on the outer housing of units 12, 30, whereby a number of illuminated LEDs corresponds to a battery level and other functions.

In an embodiment of the invention, electronic power supplied by batteries is adjustable by a user to adjust the temperature level. In one embodiment, the heat is automatically adjusted by an internal program comprising software and/or firmware. The unit could be programmed to provide initial heat that is higher than necessary for dispensing upon start up (e.g. 10 or 20 C higher than dispensing temperature). After a specified period of time, the internal program will cool down to normal dispensing temperature. The purpose is to dispense the active ingredient more quickly to rid an area of insects (using initial high heat) and subsequently maintain a cooler temperature so the mat lasts longer (using normal dispensing temperature). Further, the device may have manually adjustable temperature controls. The purpose is to be able to maximize mat life when a smaller area of coverage is required or if insect pressure is low.

Still, in another embodiment of the invention, a fuel-powered device is provided with battery-powered valve control in order to maximize efficiencies of each respective modality. That is, a dispensing unit that relies on a fuel cartridge to provide fuel for combustion is combined with a battery-powered valve controller that is used to control the output of fuel from the cartridge. In one embodiment, the valve is automatically adjusted by an internal program comprising software and/or firmware. The unit could be programmed to provide an initial increased flow of fuel in order to provide heat that is higher than necessary for dispensing upon start up (e.g. 10 or 20 C higher than dispensing temperature). After a specified period of time, the internal program will lower the amount of fuel flowing from the cartridge to cool the device down to normal dispensing temperature as described above.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A portable insect repellent device comprising:
a heating plate having a rectangular shape;
an active ingredient impregnated mat located on the heating plate;
said heating plate comprising a ceramic material, said ceramic material operating as a heating element,
said heating plate of sufficient size permitting said impregnated mat to rest thereon;
electrical power connected to said heating plate to power said insect repellent device; and
said repellent device comprising a wireless transmission/reception communication system, wherein said heating plate and said impregnated mat are carried in one housing and said electrical power is carried in a separate housing, said one housing and said separate housing being connected together, wherein said one housing and said separate housing comprise switch elements which control on/off conditions when said housings are connected or separated from each other, wherein said separate housing including a cover fitting over said heating plate, said switch element in said separate housing comprising a moveable button which controls the on/off condition of the electrical power, said cover depressing said movable button when said cover is slid on said separate housing.

2. The portable insect repellent device according to claim 1, wherein said one housing and said separate housings are separable.

3. The portable insect repellent device according to claim 1, wherein said repellent device comprises a plurality of indicator lights indicating the status of functional operations of said repellent device.

4. The portable insect repellent device according to claim 1, wherein said electrical power comprises a battery.

5. The portable insect repellent device according to claim 4, wherein said indicator lights display the status of charge of said battery.

6. The portable insect repellent device according to claim 5, wherein said wireless communication system communicates with a remote controller.

7. The portable insect repellent device according to claim 6, wherein said remote controller comprises a smartphone, said smartphone comprising an on/off command to initiate remote operation of said insect repellent device.

8. The portable insect repellent device according to claim 6, wherein said communication system within said insect repellent device transmits digital information to said remote controller, said remote controller comprising a display to display said digital information.

9. The portable insect repellent device according to claim 2, wherein said separable one housing comprises connections to other sources of electrical power.

10. The portable insect repellent device according to claim 9, wherein said other sources of electrical power are included in a movable vehicle or boat.

11. The portable insect repellent device according to claim 3, wherein said indicator lights comprise LED's.

12. The portable insect repellent device according to claim 1, further comprising a portable fuel source to heat said heating plate, said portable fuel source activated to initiate a fast heating of said heating plate, said electrical power then maintaining a desired temperature for said heating plate.

13. The portable insect repellent device according to claim 1, wherein said ceramic material is conductive.

14. The portable insect repellent device according to claim 1, wherein said ceramic material is coated with conductive material.

15. The portable insect repellent device according to claim 1, wherein said ceramic material comprises PTC ceramic elements.

* * * * *